United States Patent
Rouhollahzadeh et al.

(10) Patent No.: US 6,208,866 B1
(45) Date of Patent: Mar. 27, 2001

(54) SYSTEM AND METHOD FOR LOCATION-BASED MARKETING TO MOBILE STATIONS WITHIN A CELLULAR NETWORK

(75) Inventors: Bagher Rouhollahzadeh, Dallas; Ranjit Bhatia, Lewisville, both of TX (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/223,640

(22) Filed: Dec. 30, 1998

(51) Int. Cl.[7] .................... H04Q 7/20; H04M 11/00; G06F 17/60; G01C 21/00
(52) U.S. Cl. ............... 455/456; 455/404; 705/10; 701/213
(58) Field of Search .................. 455/414, 2, 456, 455/517, 575, 432, 435, 433, 403, 422, 550, 457, 404; 705/1, 14, 10, 13; 701/35, 117, 213, 215; 340/438, 905, 991–994

(56) References Cited

U.S. PATENT DOCUMENTS

| | | | |
|---|---|---|---|
| 5,406,271 | * | 4/1995 | Sonnendorfer et al. ........ 340/825.35 |
| 5,835,861 | * | 11/1998 | Whiteside ............................. 455/419 |
| 5,852,775 | * | 12/1998 | Hidary .................................. 455/404 |
| 5,919,239 | * | 7/1999 | Fraker et al. ........................... 701/35 |
| 6,097,313 | * | 8/2000 | Takahashi et al. .................... 340/905 |
| 6,098,048 | * | 8/2000 | Dashefsky et al. .................... 705/10 |
| 6,112,074 | * | 8/2000 | Pinder .................................. 455/404 |
| 6,154,172 | * | 11/2000 | Piccionelli et al. ............... 342/357.1 |
| 6,154,727 | * | 11/2000 | Karp et al. ........................ 455/456 X |
| 6,157,841 | * | 12/2000 | Bolduc et al. ......................... 455/456 |

* cited by examiner

Primary Examiner—Tracy Legree
(74) Attorney, Agent, or Firm—Jenkens & Gilchrist, P.C.

(57) ABSTRACT

A telecommunications system and method is disclosed for collecting mobility information regarding mobile subscribers and providing this mobility information to telemarketing companies to generate extra revenue for cellular network operators. A telemarketing application can define a target area, which includes a cell or a number of cells that are of interest for the telemarketing application, and include this defined target area in a mobility request to an Operation and Support System (OSS) within the cellular network. The OSS instructs Mobile Switching Centers (MSCs) within the target area to log the movement of each MS located in the target area and store this mobility information in a Home Location Register (HLR) or Visitor Location Register (VLR). Once all the mobility information has been collected by the MSC's, the mobility information is passed onto the OSS, which can utilize filter parameters specified by the telemarketing application in order to generate tailored mobility information.

18 Claims, 4 Drawing Sheets

SYSTEM AND METHOD FOR LOCATION-BASED MARKETING TO MOBILE STATIONS WITHIN A CELLULAR NETWORK

BACKGROUND OF THE INVENTION

FIELD OF THE INVENTION

The present invention relates generally to telecommunications systems and methods for transmitting marketing advertisements to mobile stations within a cellular network, and specifically to providing location-based marketing to mobile stations within a cellular network.

BACKGROUND AND OBJECTS OF THE PRESENT INVENTION

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR 14/16 that controls the LA 18. Each Location Area 12 is divided into a number of cells 22.

Mobile Station (MS) 20 is the physical equipment, e.g., a car phone or other portable phone, used by mobile subscribers to communicate with the cellular network 10, each other, and users outside the subscribed network, both wireline and wireless. The MS 20 may also include a Subscriber Identity Module (SIM) card, or other memory, which provides storage of subscriber related information, such as a subscriber authentication key, temporary network data, and service related data, such as language preference.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the geographical part of the cell 22 for which it is responsible. It should be understood that the BSC 23 may be connected to several BTSs 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the MSs 20 currently located within the MSC/VLR area 12. If an MS 20 roams into a new MSC/VLR area 12, the MSC 14 will request data about that MS 20 from the HLR database 26 (simultaneously informing the HLR 26 about the current location of the MS 20) and store the data in the VLR 16 connected to that MSC 14. Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

An Operation and Support System (OSS) 30 is connected to the HLR 26, MSC 14, VLR 16 and BSC 23 to provide customer cost-effective support for the centralized, regional and local operational and maintenance activities for the PLMN 10. The main purpose of the OSS 30 is provide a network overview and support maintenance for the PLMN 10.

In today's society, marketing companies use all kinds of data to market their products to target consumers. For example, the telephone companies sell their telephone listings to various telemarketing companies to enable them to perform direct marketing to consumers. The telephone listings typically contain the name of the person associated with the telephone number and the address of the person. There are currently products available in the market that can collect data from various listings and include this data with the telephone listings.

Cellular network operators also sell their telephone listing to telemarketing companies in order to provide an extra source of revenue. However, one additional piece of information which could be of great important to telemarketing companies is mobility information regarding mobile subscribers. This mobility information is currently not provided by the cellular network operators to the telemarketing companies.

It is, therefore, an object of the present invention to allow cellular network operators to collect and analyze mobility information regarding mobile subscribers and provide this mobility information to telemarketing companies to generate additional revenue.

SUMMARY OF THE INVENTION

The present invention is directed to telecommunications systems and methods for collecting and analyzing mobility information regarding mobile subscribers and providing this mobility information to telemarketing companies to generate extra revenue for cellular network operators. A telemarketing application can define a target area, which includes a cell or a number of cells that are of interest for the telemarketing application, and include this defined target area in a mobility request to an Operation and Support System (OSS) within the cellular network. The OSS instructs Mobile Switching Centers (MSCs) within the target area to log the movement of each MS located in the target area and store this mobility information in a Home Location Register (HLR) or Visitor Location Register (VLR). Once all the mobility information has been collected by the MSC's, the mobility information is passed onto the OSS, which can utilize filter parameters specified by the telemarketing application in order to generate tailored mobility information for the telemarketing application, which can provide this tailored mobility information to the telemarketing companies for use in targeteting specific MS's for telemarketing advertisements.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
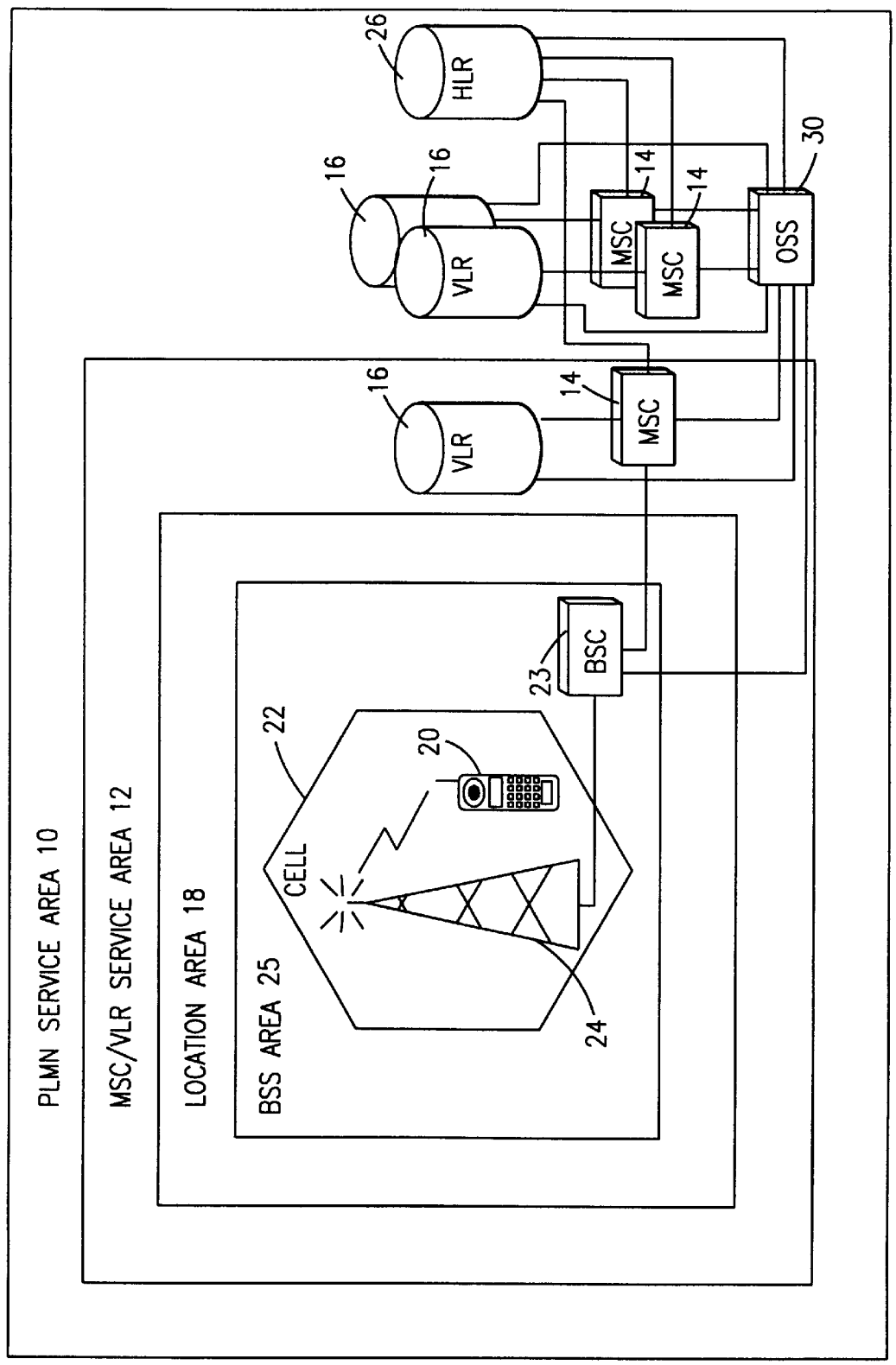
FIG. 1 is a block diagram of a conventional wireless telecommunications system.
Figure 2:
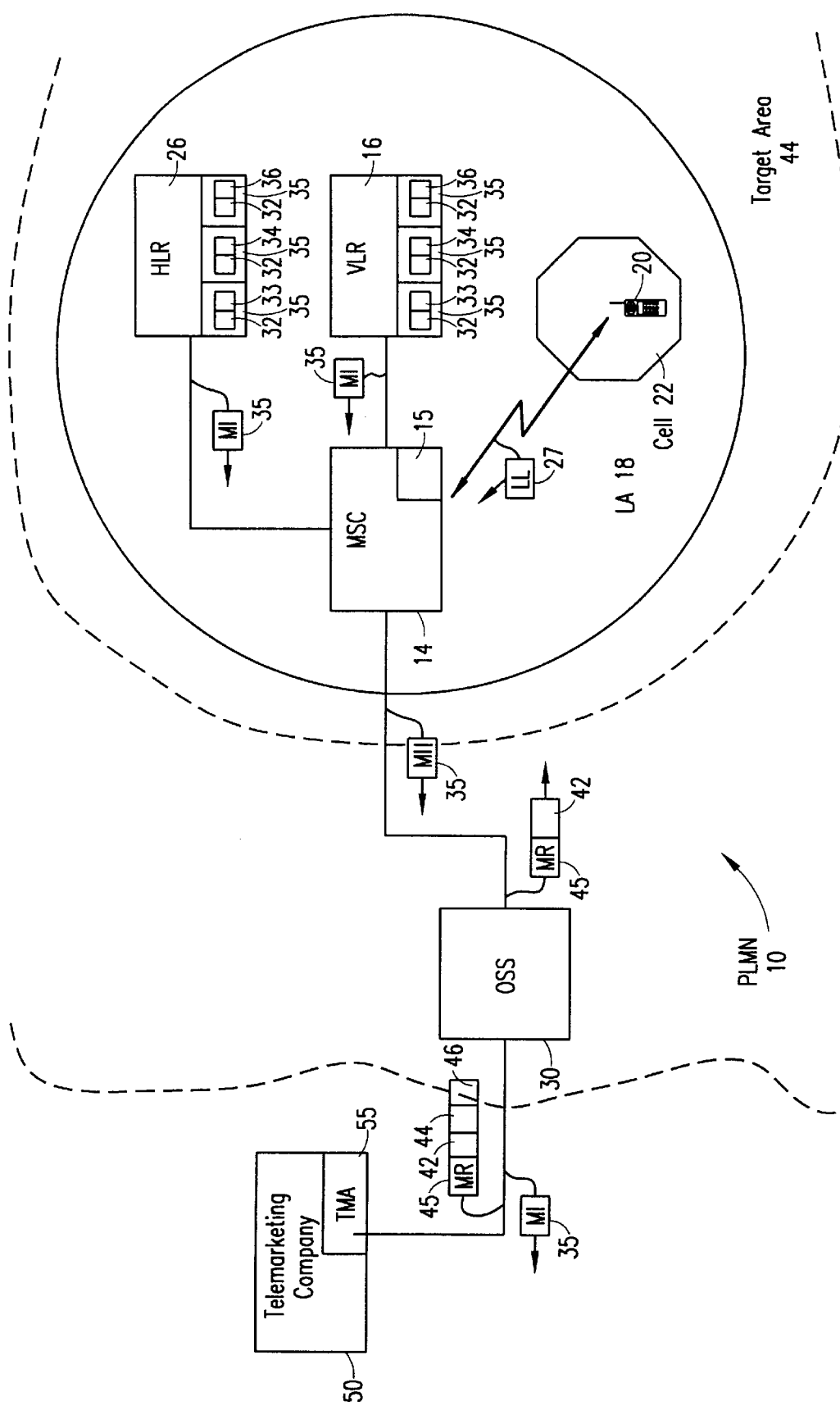
FIG. 2 illustrates the collection of mobility information for mobile stations located within a target area specified by a telemarketing application.
Figure 3:
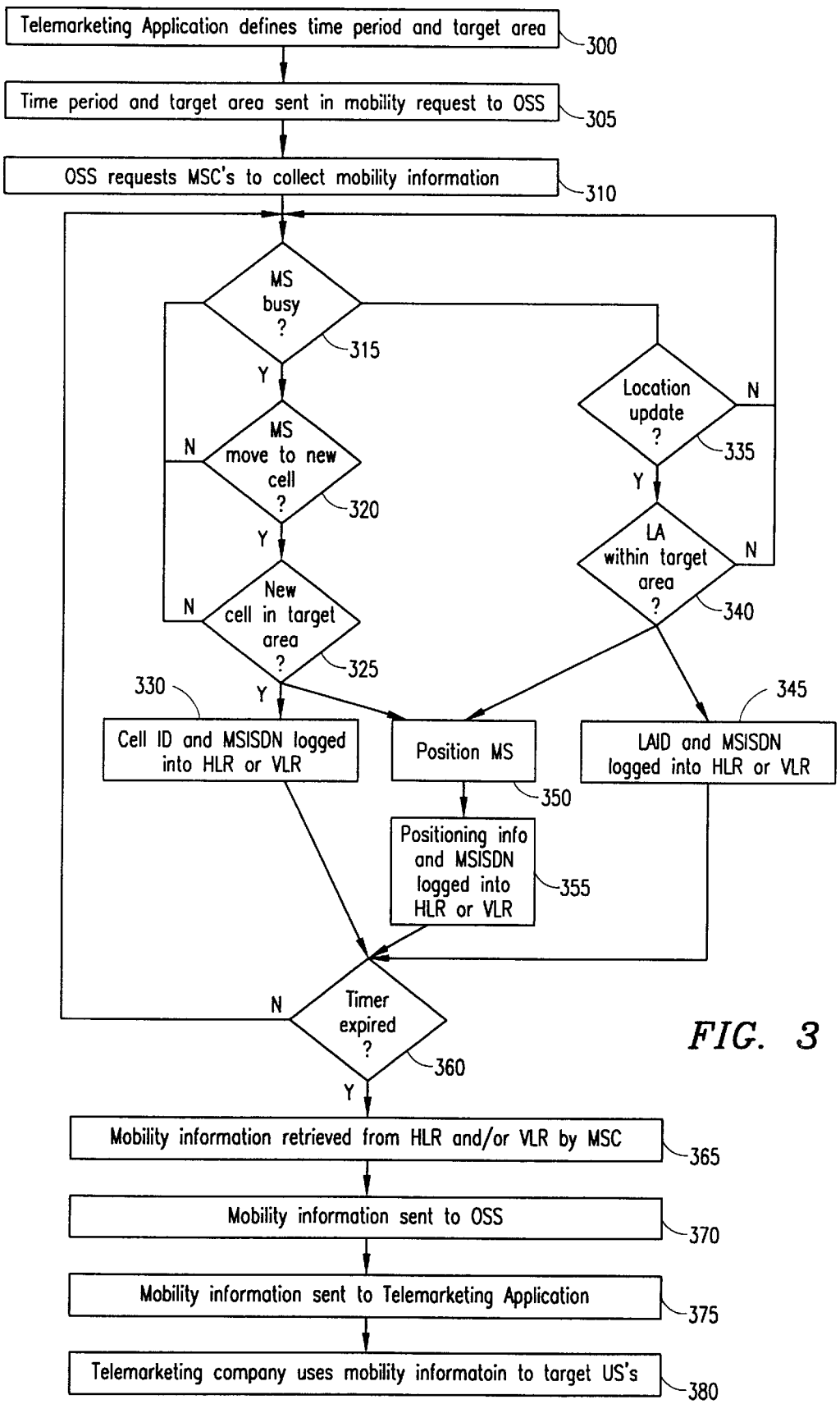
FIG. 3 is a flow chart illustrating steps for implementing the collection process shown in FIG. 2 of the drawings.

With reference now to FIG. 2 of the drawings, which will be described in connection with the steps listed in FIG. 3 of the drawings, a cellular network operator can collect and analyze mobility information 35 for mobile stations (MSs) 20 within a cellular network 10 and provide this mobility information 35 to telemarketing companies 50 in order to generate extra revenue for the cellular network operator. This mobility information 35 can be beneficial to telemarketing companies 50 in many ways. For example, if a new store in the cellular network area 10 wants to target a certain group of mobile subscribers who pass by the store at a certain time of the day or a certain day of the month, the store can ask the cellular network operator to provide a list of target MSs 20 that fit this criteria.

Prior to creating the list of target MSs 20, mobility information 35 regarding the MSs 20 located within the cellular network 10 must be collected and analyzed. A telemarketing application 55 within the telemarketing company 50 can define a time period 42 and a target area 44, which includes at least one cell 22b within the cellular network 10 that is of interest to the telemarketing company 50 (step 300). This time period 42 and target area 44 are included in a mobility request 45 to an Operation and Support System (OSS) 30 within the cellular network 10 (step 305).

Based upon this target area 44, the OSS 30 sends this mobility request 45 and specified time period 42 to all Mobile Switching Centers (MSCs) 14 within the target area 44. The mobiity request 45 instructs the MSCs 14 to collect mobility information 35 for the MS's 20 they serve for the specified time period 42, which could be, for example, an hour, a day or a week (step 310). For example, if an MS 20 is in busy mode (step 315), e.g., involved in a call connection, each time the MS 20 roam into a cell 22 (step 320) within the target area 44 (step 325), the MSC 14 serving the MS 20 logs mobility information 35 (step 330) into a Home Location Register (HLR) 26 associated with the MS 20 or a Visitor Location Register (VLR) 16 connected to the MSC 14. The mobility information 35 can include, for example, MS identity information 32, such as a Mobile Station Integrated Services Digital Network (MSISDN) number, along with cell identity information 33 associated with the cell 22. Alternatively, if the MS 20 is in idle mode (step 315), when the MS 20 performs a location update 27 (step 335) upon entering a new location area 18 within the target area 44 (step 340), the mobility information 35 can be logged into the HLR 26 or VLR 16 (step 345). In this case, the mobility information can include MS identity information 32 along with location area identity information 34 associated with the new location area 18.

In an alternative embodiment, the mobility information 35 can include positioning information 36, e.g., X, Y coordinates of the MS 20 location, which can be obtained by positioning the MS 20 in the target area 44 at any time within the specified time period 42. For example, when the MS 20 enters an LA 18 within the target area 44 (step 340) or moves into a cell 22b within the target area 44 (step 325), this could trigger a positioning application (PA) 15 within the serving MSC 14 to position the MS 20 (step 350) and log mobility information 35 including positioning information 36 and MS identity information 32 within the HLR 26 or VLR 16 (step 355).

Figure 4:
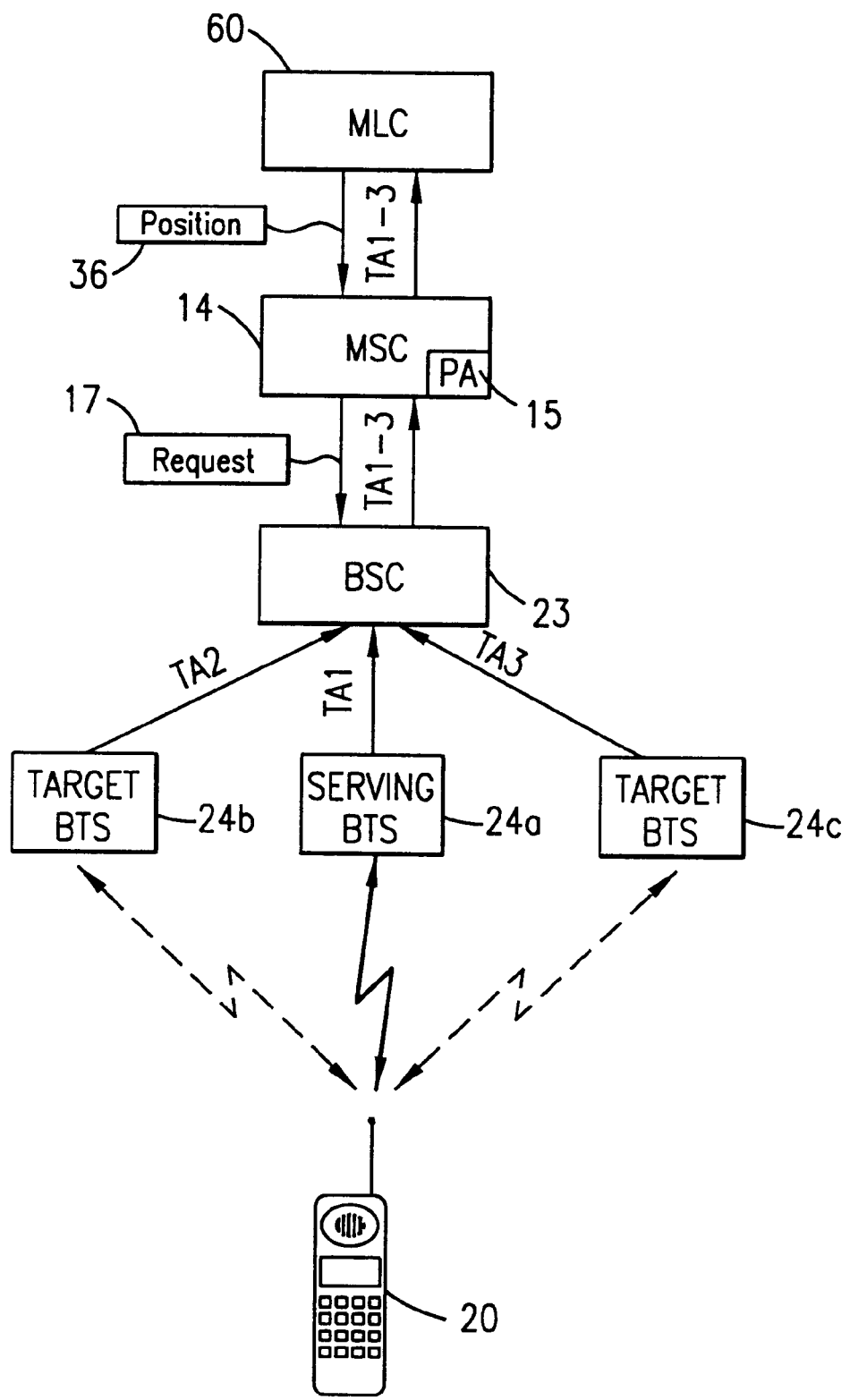
FIG. 4 illustrates a sample positioning of a mobile station within a cellular network.

With reference now to FIG. 4 of the drawings, a sample positioning of the MS 20 can be performed by the PA 15 within the MSC 14 forwarding a positioning request 17 to a Base Station Controller (BSC) 23 serving the MS 20. It should be noted that if the MS 20 is not engaged in a call connection, e.g., the MS 20 is in idle mode, the MSC 14 must first page the MS 20 prior to forwarding the positioning request 17 to the BSC 23 (step 550).

The originating BSC 23 determines which Base Transceiver Station (BTS) 24a is currently serving the MS 20, and obtains a Timing Advance (TA) value (TA1), or other positioning data, from this serving BTS 24a, if possible. TA values corresponds to the amount of time in advance that the MS 20 must send a message in order for the BTS 24a to receive it in the time slot allocated to that MS 20. When a message is sent from the MS 20 to the BTS 24a, there is a propagation delay, which depends upon the distance between the MS 20 and the BTS 24a. TA values are expressed in bit periods, and can range from 0 to 63, with each bit period corresponding to approximately 550 meters between the MS 20 and the BTS 24a.

Thereafter, TA values are obtained from at least two target BTSs (24b and 24c) by performing a positioning handover. If the serving BTS 24a does not support positioning, an additional target BTS (not shown) must be selected. It should be noted that positioning of the MS 20 can be performed using more than three BTSs (24a, 24b, and 24c). Thereafter, the TA values (TA1, TA2 and TA3) measured by the BTS's (24a, 24b and 24c) are transmitted by the serving BSC 23 to the MSC 14.

Finally, the TA values (TA1, TA2 and TA3) and the positioning request 17 are forwarded to a serving Mobile Location Center (MLC) 60, where the location of the MS 20 is determined using, for example, a triangulation algorithm. Once the MS 20 location is calculated, the MLC 60 presents positioning information 36 representing the geographical location of the MS 20 to the requesting PA 17, which can log the positioning information 36 and MS identity information 32 in the HLR 26 associated with the positioned MS 20 or the VLR 16 associated with the serving MSC 14. Thereafter, in preferred embodiments, the PA 15 can periodically position the MS 20 within the specified time period 42 while the MS 20 is still located within the target area 44.

It should be understood, however, that any estimate of time, distance, or angle for any cellular system can be used, instead of the TA value method discussed herein. For example, the MS 20 can have a Global Positioning System (GPS) receiver built into it, which can be used to determine the location of the MS 20. In addition, the MS 20 can collect positioning data based on the Observed Time Difference (OTD) between the time a BTS 24 sends out a signal and the time the MS 20 receives the signal. This time difference information can be sent to the MLC 270 for calculation of the location of the MS 20. Alternatively, the MS 20, with knowledge of the location of the BTS 24, can determine its location and forward it to the MLC 60.

With reference again to FIGS. 2 and 3 of the drawings, at the expiration of the specified time period 42 (step 360), once all the mobility information 35, e.g., MS identity information 32 and associated location area identity information 34, cell identity information 33 and/or positioning information 36, has been collected, the MSC 14 retrieves the mobility information 35 from the HLR 26 or VLR 16 (step 365) and sends this mobility information 35 to the OSS 30 (step 370). The OSS 30, in turn, provides this mobility information 35 to the telemarketing application 55 (step 375), which can provide this mobility information 35 to the telemarketing company 50 associated with the telemarketing application 55 for use in targeting MS's 20 for telemarketing advertisements (step 380).

Alternatively, the OSS 30 can tailor the mobility information 35 using filter parameters 46 provided by the telemarketing application 55 in the mobility request 45 before sending the mobility information 35 to the telemarketing application 55. For example, the telemarketing application 55 may be associated with a fast food company 50, which would like to target all MS's 20 that were in the target area 44 between the hours of 12:00 pm and 1:00 pm on a specified day. If the specified time period 42 for collecting the mobility information 35 is longer than the desired target time period, e.g., 12:00 pm to 1:00 pm, the OSS 30 can tailor the mobility information 35 to include only the MS identity information 32 and associated cell identity information 33, location area identity information 34 and/or position information 36 for the MS's 20 that were in the target area 44 between the hours of 12:00 pm and 1:00 pm. The telemarketing application 55 can provide this tailored mobility information 35 to the fast food company 50 for use in targeting MS's 20 for telemarketing advertisements. The telemarketing advertisements can be sent to the targeted MS's 20, using, for example, a Short Message Service (SMS) message.

As another example, if positioning information 36 was collected for MS's 20 within the target area 44, the filter parameters 46 can include a range of coordinates or other location parameters, which the OSS 30 can use to tailor the mobility information 35 to include only those MS's 20 that were within the location parameters within the target area 44 within the specified time period 42. It should be noted that the filter parameters 46 can be any type of parameter that modifies the mobility information 35, including, but not limited to time constraints, supplementary service constraints, position information constraints and subscriber characteristic constraints.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for providing mobility information for a plurality of mobile stations within a cellular network to a telemarketing company, comprising:

an operation and support system within said cellular network for receiving a mobility request defining a target area within said cellular network from a telemarketing node, collecting mobility information for select ones of said plurality of mobile stations that are within said target area and providing said mobility information to said telemarketing node;

at least one mobile switching center serving a service area within said target area for receiving said mobility request from said operation and support system, collecting said mobility information and providing said mobility information to said operation and support system; and a node for storing said mobility information received by said mobile switching center.

2. The telecommunications system of claim 1, wherein said node further comprises:

a visitor location register connected to a respective one of said at least one mobile switching center for receiving said mobility information from said respective mobile switching center and storing said mobility information therein.

3. The telecommunications system of claim 2, wherein said mobility request further includes a specified time period, said visitor location register sending said mobility information stored therein to said respective mobile switching center at the expiration of said specified time period.

4. The telecommunications system of claim 1, wherein said node further comprises:

a home location register associated with at least one of said select mobile stations for receiving said mobility information from said at least one mobile switching center for said at least one of said select mobile stations and storing said mobility information for said at least one of said select mobile stations therein.

5. The telecommunications system of claim 4, wherein said mobility request further includes a specified time period, said home location register sending said mobility information stored therein to said at least one mobile switching center at the expiration of said specified time period.

6. The telecommunications system of claim 1, wherein said mobility information includes mobile station identity information for said select mobile stations and at least one of: positioning information, cell identity information or location area identity information associated with said select mobile stations.

7. The telecommunications system of claim 1, wherein said mobility request further includes filter parameters for use by said operation and support system in creating a select group of said mobility information that satisfies said filter parameters, said select group of said mobility information being sent to said telemarketing node.

8. A method for providing mobility information for a plurality of mobile stations within a cellular network to a telemarketing node, comprising the steps of:

receiving, by an operation and support system within said cellular network, a mobility request including a target area from said telemarketing node;

collecting mobility information for select ones of said plurality of mobile stations that are within said target area; and providing said mobility information to said telemarketing node by said operation and support system.

9. The method of claim 8, wherein said step of collecting further comprises the steps of:
   receiving, by at least one mobile switching center serving a service area within said target area, said mobility request from said operation and support system;
   collecting, by said at least one mobile switching center, said mobility information; and
   providing said mobility information from said at least one mobile switching center to said operation and support system.

10. The method of claim 9, wherein said step of collecting said mobility information by said at least one mobile switching center further comprises the steps of:
   receiving, by a visitor location register connected to a respective one of said at least one mobile switching center, said mobility information from said respective mobile switching center; and
   storing said received mobility information within said visitor location register.

11. The method of claim 10, wherein said mobility request further includes a specified time period, and wherein said step of providing said mobility information from said at least one mobile switching center to said operation and support system further comprises the step of:
   sending, by said visitor location register, said mobility information stored therein to said respective mobile switching center at the expiration of said specified time period.

12. The method of claim 9, wherein said step of collecting by said at least one mobile switching center further comprises the steps of:
   receiving, by a home location register associated with at least one of said select mobile stations, said mobility information from said at least one mobile switching center for said at least one of said select mobile stations; and
   storing said received mobility information for said at least one of said select mobile stations within said home location register.

13. The method of claim 12, wherein said mobility request further includes a specified time period, and wherein said step of providing said mobility information from said at least one mobile switching center to said operation and support system further comprises the step of:
   sending, by said home location register, said mobility information stored therein to said at least one mobile switching center at the expiration of said specified time period.

14. The method of claim 8, wherein said mobility request further includes filter parameters, and wherein said step of collecting further comprises the step of:
   creating, by said operation and support system, a select group of said mobility information that satisfies said filter parameters.

15. The method of claim 14, wherein said step of providing further comprises the step of:
   providing said select group of mobility information to said telemarketing node.

16. The method of claim 8, wherein said step of collecting further comprises the step of:
   positioning said select mobile stations within said target area to obtain positioning information associated with said select mobile stations, said positioning information being included within said mobility information.

17. The method of claim 8, wherein said step of collecting further comprises the steps of:
   entering, by a given one of said select mobile stations, a location area within said target area;
   performing, by said given mobile station, a location update to a mobile switching center serving said location area;
   storing, by said mobile switching center, said mobility information for said given mobile station within a register associated with said mobile switching center, said mobility information including identity information for said location area and identity information for said given mobile station; and
   providing said mobility information from said mobile switching center to said operation and support system.

18. The method of claim 8, wherein said step of collecting further comprises the steps of:
   entering, by a given one of said select mobile stations, a cell within said target area;
   storing, by a mobile switching center in wireless communication with said given mobile station, mobility information for said given mobile station in response to entering said cell within a register associated with said mobile switching center, said mobility information including identity information for said cell and identity information for said given mobile station; and
   providing said mobility information from said mobile switching center to said operation and support system.

* * * * *